United States Patent [19]

Sheppard

[11] 3,893,960
[45] July 8, 1975

[54] ACRYLIC COATING COMPOSITION FOR FINISHING FLEXIBLE SUBSTRATES

[75] Inventor: Ronald J. Sheppard, Flushing, Mich.

[73] Assignee: E. I. du Pont de Nemours & Company, Wilmington, Del.

[22] Filed: May 9, 1974

[21] Appl. No.: 468,482

Related U.S. Application Data

[62] Division of Ser. No. 285,094, Aug. 30, 1972, Pat. No. 3,829,397.

[52] U.S. Cl........ 260/23 AR; 117/87; 117/138.8 A; 117/138.8 D; 117/138.8 UA; 117/161 C; 117/161 UZ; 117/161 UN; 117/161 UC; 260/17 R; 260/31.8 M; 260/31.8 G; 260/31.8 AN; 260/32.8 N; 260/33.2 R; 260/33.4 R; 260/33.6 UA; 260/895; 260/901

[51] Int. Cl... C08b 21/08; C08f 37/18; C08f 37/06; C08f 45/38

[58] Field of Search. 260/31.8 M, 31.8 G, 31.8 AN, 260/32.8 N, 23 AR, 17 R, 901, 895

[56] References Cited
UNITED STATES PATENTS

| | | | |
|---|---|---|---|
| 3,037,006 | 5/1962 | Hankins et al. | 260/80.5 |
| 3,488,307 | 1/1970 | Walus et al. | 260/23 AR |
| 3,553,124 | 1/1971 | Donatello et al. | 260/23 AR |
| 3,711,433 | 1/1973 | Willey | 260/17 R |
| 3,753,935 | 8/1973 | Miller | 260/31.8 M X |
| 3,832,217 | 8/1974 | Sato et al. | 260/17 R |
| 3,844,993 | 10/1974 | Miller | 260/17 R X |

*Primary Examiner*—Melvin Goldstein
*Assistant Examiner*—W. C. Danison

[57] ABSTRACT

The coating composition is useful for reparing the finish of flexible automobile and truck bumpers and comprises a blend of the following polymers:

1. a copolymer of methyl methacrylate and an alkyl acrylate or an alkyl methacrylate having 2–12 carbon atoms in the alkyl groups;
2. a copolymer of methyl methacrylate and an adhesion of promoting monomer such as the 3-2-methacryloxyethyl (-2,2 spiro cyclohexyl oxazolidine);
3. a plasticizer which is either a phthalate ester such as butyl benzyl phthalate or butyl cyclohexyl phthalate or an alkyd resin;

the novel composition can be blended with other pigmented acrylic polymer coating compositions to form a high quality refinish composition for flexible bumpers.

5 Claims, No Drawings

ACRYLIC COATING COMPOSITION FOR FINISHING FLEXIBLE SUBSTRATES

This is a division of application Ser. No. 285,094, filed Aug. 30, 1972, now U.S. Pat. No. 3,829,397.

BACKGROUND OF THE INVENTION

This invention is related to a polymeric coating composition and in particular, to a polymeric coating composition that is useful for refinishing flexible substrates.

The automobile and truck manufacturing industry is utilizing bumpers coated with a flexible material such as a high density polyurethane foam, a hydrocarbon rubber or polyvinyl chloride. These flexible bumpers are coated in the factory with a primer and a topcoat that requires baking to cure the resulting finish. But when these automobile or truck bumpers become damaged in use, an air dry refinish composition is preferred for low cost maintenance. The novel coating composition of this invention has air drying characteristics and adheres to the primed flexible substrate of the bumper and also to the factory applied topcoat of the bumper. Also, the novel coating composition can be blended with other pigmented acrylic compositions to form a high quality finish for flexible bumpers.

SUMMARY OF THE INVENTION

A coating composition comprising 10 – 50% by weight of film forming binder and correspondingly 90 – 50% by weight of an organic solvent for the binder wherein the binder consists essentially of 1. 35 – 65% by weight, based on the weight of the binder, of a copolymer consisting essentially of 80 – 90% by weight of methyl methacrylate and correspondingly 10 – 20% by weight of an alkyl acrylate or an alkyl methacrylate having 2 – 12 carbon atoms in the alkyl groups;

2. 5 – 20% by weight of the copolymer consisting essentially of 85 – 95% by weight of methyl methacrylate and 5 – 15% by weight of an adhesion promoting monomer of the formula

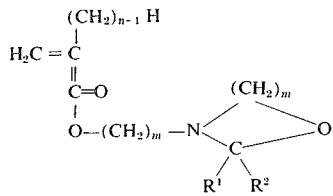

where $n$ is 1 – 2, $m$ is 2 – 3 and $R^1$ and $R^2$ are hydrogen, phenyl, benzyl or an alkyl group having 1 – 12 carbon atoms or in combination are 2,2-spirocyclohexyl; and 3. 30 – 50% by weight of a plasticizer which is either a phthalate ester such as butyl benzyl phthalate or butyl cyclohexyl phthalate or an alkyd resin such as a 35% coconut oil 65% glycerol phthalate alkyd resin.

DESCRIPTION OF THE INVENTION

The novel coating composition of this invention contains about 10 – 50% by weight of the film forming binder and correspondingly about 90 – 50% by weight of an organic solvent for the binder. The novel coating composition can contain a 0.1 – 20% by weight pigment but preferably is utilized as a clear coating composition.

The film forming binder utilized in the novel coating composition of this invention contains a blend of acrylic polymers and a plasticizer. The acrylic polymers have a relative viscosity of about 1.03 – 1.50, preferably about 1.10 – 1.25. The relative viscosity is a value obtained by dividing the efflux time of the solution of the polymer by the efflux time of a solvent used to form the solution. The efflux times are measured according to the procedure of ASTMD-445-46 T method B. using as the polymer solution 0.25 gram of the polymer and 50 cubic centimeters of ethylene dichloride as a solvent. The efflex times are measured at 25°C. using standard apparatus sold under the designation of a modified Ostwald viscometer.

These acrylic copolymers are prepared by conventional polymerization techniques in which the monomers, the solvents, and polymerization catalysts are charged into a reaction vessel and the reaction mixture is heated to about 50° – 200° C. and reacted from about 1 to 6 hours to form a polymer having the aforementioned viscosity range.

The following are typical of polymerization catalysts which can be used to prepare these polymers such as azo, bis-isobutyronitrile, azo-bis-(α, gamma-dimethylvaleronitrile), benzoyl peroxide, t-butylperoxypivalate, di-tertiary - butyl peroxide and the like.

Typical solvents which are used to prepare the acrylic polymers utilized in this invention are toluene, xylene, butylacetate, acetone, methylisobutylketone, methylethyl ketone, butyl alcohol, and other aliphatic, cycloaliphatic, aromatic hydrocarbons, esters, ethers, ketones and alcohols.

The novel coating composition of this invention contains 35 – 65% by weight, based on the weight of the binder of a copolymer of 80 – 90% by weight of methyl methacrylate and correspondingly 10 – 20% by weight of an alkyl acrylate or an alkyl methacrylate that has 2 – 12 carbon atoms in the alkyl groups. Preferably, novel coating composition contains 46 – 56% by weight, based on the weight of the binder of this copolymer.

Typical alkyl acrylates or alkyl methacrylates that can be utilized in preparing this copolymer are ethyl acrylate, propyl acrylate, butyl acrylate, isobutyl acrylate, hexyl acrylate, 2 ethyl hexyl acrylate, nonyl acrylate, pentyl acrylate, lauryl acrylate, ethyl methacrylate, propyl methacrylate, butyl methacrylate, isobutyl methacrylate, hexyl methacrylate, 2 ethyl hexyl methacrylate, octylmethacrylate, nonyl methacrylate, pentyl methacrylate and lauryl methacrylate.

One preferred copolymer contains 82% by weight of methyl methacrylate and 18% by weight of butyl acrylate.

A novel coating composition contains 5 – 20% by weight and preferably 10–14% by weight of an adhesion promoting copolymer of 85 – 95% by weight of methyl methacrylate and 5 – 15% by weight of the adhesion promoting monomer.

The adhesion promoting monomer utilized in the above copolymer has the following formula:

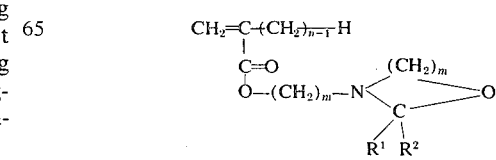

wherein n is 1 – 2 and m is 2 – 3, $R^1$ and $R^2$ are hydrogen, phenyl, benzyl or an alkyl group having 1 – 12 carbon atoms. Typical compounds of this type are 3 - (2-methacryloxyethyl) -2, 2 - spirocyclohexyl oxazolidine, 3 - (2-ethylacryloxymethyl) -2, 2 - spirocyclohexyl oxazolidine and the like. The preferred compound is 3 - (2 - methylacryloxyethyl) -2, 2 - spiro cyclohexyl oxazolidine. Preparation of these adhesion promoting monomers is disclosed in Hankins, et al., U.S. Pat. No. 3,037,006, issued May 29, 1962.

The novel coating composition contains 30 – 50% by weight, and preferably 38 – 42% by weight of a plasticizer which is either phthalate ester plasticizer or an alkyd resin plasticizer. Typical phthalate ester plasticizers that can be used are aromatic phthalate esters or cycloaliphatic phthalate esters such as butyl benzyl phthalate or butyl cyclohexyl phthalate.

Typical alkyd resins which can be used are the reaction product of nondrying oil fatty acids, a polyhydric alcohol, dicarboxylic acid or its anhydride. Typical non-drying oil fatty acids which can be used are cottonseed oil fatty acids, castor oil fatty acids, coconut oil fatty acids, and the like. Typical polyhydric alcohols that can be used are glycerin, pentaerythritol, trimethylolethane, trimethylolpropane, glycols such as ethylene glycol, propylene glycol, butanediol, pentanediol and the like. Typical dicarboxylic acids or the anhydrides thereof can be used to prepare this alkyd resin plasticizer are phthalic acid, phthalic anhydride, isophthalic acid, terephthalic acid, adipic acid, sebacic acid, succinic acid, maleic acid, maleic anhydride, fumaric acid and the like.

It may be desirable to incorporate a small portion of mono-carboxylic aromatic acid into the alkyd resin plasticizer. Typical acids that can be used are benzoic acid, paratertiarybutylbenzoic acid, phenolacetic acid, triethyl benzoic acid and the like.

The alkyd resin plasticizers are utilized in the novel coating composition of this invention, preferably having an acid number of about 2-25, preferably about 5-14 and are about 5-7 acid number units from the gel point of the alkyd resin.

One preferred alkyd resin used in this invention is the esterification product of coconut oil, ethylene glycol and phthalic acid or phthalic anhydride and the resulting product contains 35% coconut oil/61% ethylene glycol phthalate/4% ethylene glycol.

Polyester plasticizers can also be used. Any of the aforementioned polyhydric alcohols and dicarboxylic acids can be used to form these polyesters. Also, small amounts of the above monocarboxylic acids can be incorporated into these polyesters. Typically useful polyester plasticizers are as follows: adipic acid/phthalic anhydride/ethylene glycol/benzoic acid in a molar ratio of 1.5/1.5/4.0/1.9; adipic acid/phthalic anhydride/ethylene glycol/neopentyl glycol/benzoic acid modified with propylene imine in a weight ratio of 36/27.5/15.3/17.4/3.8//3.8.

The novel coating composition of this invention preferably is utilized as a clear but can be pigmented with any of the conventional pigments. Typical pigments which can be used are metallic oxides such as titanium dioxide, iron oxide, zinc oxide and the like, metal hydroxides, metal flakes such as aluminum flake, metal powders, chromates, sulfates, carbonates, carbon black, silica, talc, phthalocyanine blues and greens, and other organic pigments and dyes.

The novel coating composition is applied by conventional techniques such as spraying, electrostatic spraying, dipping, brushing, flow coating and the like to a flexible substrate. The novel composition can be applied to a variety of flexible substrates such as filler panels, moldings, extension panels and the like. But the primary use for the novel coating composition of this invention is to refinish flexible bumpers which are coated with one of the following: a high density polyurethane foam, a hydrocarbon rubber such as an ethylene-propylene terpolymer sulfur curable elastomer, styrene-butadiene rubber, polyvinyl chloride and the like.

Preferably the technique that is used to refinish bumpers is to apply a clear coating of the novel coating composition of this invention about 0.1 – 1.0 mils in thickness and then allow this coating to air-dry and then apply a second pigmented coating about 1 – 4 mils in thickness and then allow this coating to air-dry. This second pigmented coating is a blend of the clear coating composition of this invention and a pigmented coating composition.

Pigmented coating compositions of a variety of acrylic enamels, lacquers, repair enamels, and repair lacquers can be blended with the novel coating composition of this invention and the color of the bumper can be matched without the development of a mill base for the novel coating composition of this invention. The compatibility of the novel coating of this invention makes this technique possible.

The novel coating composition of this invention either alone or one blended with one of the aforementioned pigmented compositions provides a finish upon drying which is durable, flexible and glossy and makes an attractive finish for flexible automotive and truck bumpers. The adhesion of the novel composition is particularly good to the primed flexible bumper substrate and the novel composition also has good adherence to either the lacquer or the enamel coating which was originally used to coat the flexible bumper. These characteristics along with the air-drying properties of the novel coating composition of this invention makes the composition particularly attractive for the refinish of flexible automotive and truck bumpers and other flexible automobile and truck parts.

When the novel coating composition of this invention is utilized with another pigmented coating composition, generally 40 – 60% by volume of the novel coating composition of this invention is blended with corresponding 60 – 40% by volume of another pigmented coating composition. These pigmented coating compositions generally contain 0.1 – 20% by weight of pigment and 10 – 50% by weight of the film-forming binder. Any of the aforementioned pigments can be used therein.

One pigmented coating composition which provides a high quality refinish for acrylic enamels contains
A. 40 to 90% by weight, based on the weight of the binder of a polymer of
 1. 75 to 95% by weight, based on the weight of the polymer, of methy methacrylate;
 2. less than about 20% by weight, based on the weight of the polymer, of an alkyl acrylate or alkyl methacrylate 2 – 12 carbon atoms in the alkyl groups (typical esters have been mentioned above);
 3. 3–25% by weight based on the weight of the polymer, of a monovalent aminoester radical attached to the backbone of the carbon atoms of the polymer backbone that has the formula

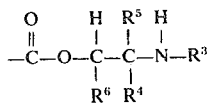

wherein $R^3$, $R^4$, $R^5$, and $R^6$ are either hydrogen or benzyl and an alkyl radical having 1 – 4 carbon atoms; and B. 60 – 10% by weight, based on weight of the binder, of an acrylic oxazoline polymer, which is
1. 30 – 70% by weight, based on the weight of the polymer, of methyl methacrylate;
2. less than about 35% by weight of alkyl acrylate or an alkyl methacrylate having 2 – 12 carbon atoms in the alkyl group;
3. less than about 10% by weight of acrylonitrile;
4. 15 – 35% by weight of a compound of the formula

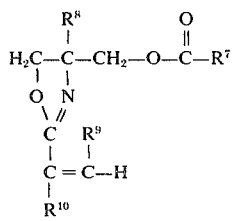

wherein $R^7$ is a saturated hydrocarbon group of 3 – 21 carbon atoms or an unsaturated hydrocarbon group of 3 – 21 carbon atoms; $R^8$ is hydrogen, and alkyl group having 1 – 4 carbon atoms or

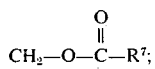

$R^9$ is H, an alkyl group having 1 – 4 carbon atoms, $R^{10}$ is a saturated hydrocarbon group having 2 – 20 carbon atoms or an unsaturated hydrocarbon group having 2 – 20 carbon atoms.

One particularly preferred composition of this type which can be blended with the novel coating composition of this invention has a film forming binder which consists essentially of A. 50 – 60% by weight, based on the weight of the binder of a polymer that contains
1. 78 – 82% by weight of methyl methacrylate,
2. 12 – 14% by weight of ethyl acrylate,
3. 5 – 8% by weight of a monovalent amino ester groups attached to the carbon atoms of the backbone of the polymer of the formula

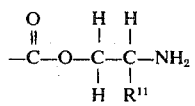

where $R^{11}$ is hydrogen or methyl and

B. 50 – 40% by weight, based on the weight of the binder of an acrylic oxazoline polymer of 1. 53 – 57% by weight of methyl methacrylate,
2. 13 – 17% by weight of ethyl acrylate,
3. 3 – 7% by weight of acrylonitrile,
4. 23 – 27% by weight of a compound of the formula

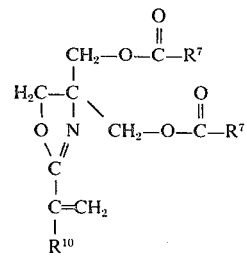

where $R^7$ is a hydrocarbon group of tall oil fatty acids and $R_{10}$ is a hydrocarbon group of tall oil fatty acids less a $CH_2$ group.

The aforementioned pigmented coating composition is prepared according to the teachings of Walus, et al., U.S. Pat. No. 3,488,307 issued Jan. 6, 1970.

Another refinish composition which is particularly useful for repairing acrylic lacquer coatings contains 40 – 60% by volume of the novel binder composition of this invention and correspondingly 60 – 40% by volume of a pigmented coating composition that contains 0.1 – 20% by weight of pigment and 10 – 50% by weight of a film forming binder of 70 – 90% by weight, based on the weight by binder, of polymethyl methacrylate or a copolymer of methyl methacrylate or a mixture of polymethyl methacrylate and a copolymer of methyl methacrylate and a copolymer of methyl methacrylate;

10 – 30% by weight, based on the weight of the binder, of cellulose acetate butyrate that has a 0.1 – 20 seconds viscosity, preferrably 0.5 – 4 seconds viscosity which is measured at 25°C according to ASTM D - 1343 - 56 and has a butyryl content of about 30 – 55% by weight.

One preferred pigmented coating composition of this type contains

20 – 30% by weight, based on the weight of the binder, of polymethyl methacrylate;

5 – 15% by weight, based on the weight of the binder, of the copolymer of methyl methacrylate and diethyl aminoethyl methacrylate;

30 – 40% by weight, based on the weight of the binder, of a copolymer of methyl methacrylate and butyl acrylate and 15 – 30% by weight of cellulose acetate butyrate having a 1 to 3 second viscosity and a butryl content as indicated above.

Another coating composition which is particularly useful for repairing acrylic lacquers comprised 40 – 60% by volume of the coating composition of this invention and correspondingly 60 – 40% by volume of a pigmented composition that contains 0.1 to 20% by weight pigment and 10 – 50% by weight of a film forming binder. The film forming binder comprises A. 40 – 60% by weight, based on the weight of the binder of an acrylic oxazoline polymer discribed above B. 60 – 40% by weight, based on weight of the binder of cellulose acetate butyrate that has a viscosity of 0.5 – 20 seconds measured as indicated above and a butyryl content of 30 – 55% by weight; and C. 0 – 10% by weight of an organic plasticizer.

One preferred pigmented composition of this type contains

A. 40 – 50% by weight of a polymer of
53 – 57% by weight methyl methacrylate,
13 – 17% by weight of ethyl acrylate,
3 – 7% by weight of acrylonitrile, and
23 – 27% by weight of a compound of the formula

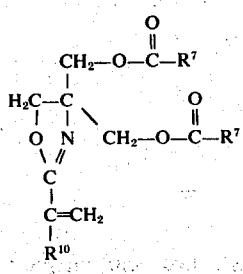

wherein $R^7$ is a hydrocarbon group of tall oil fatty acids and $R^{10}$ is a hydrocarbon group of tall oil fatty acids less a $CH_2$ group.

B. 47 – 57% by weight of cellulose acetate butyrate has a 1 – 3 second viscosity and butyryl content of 35 – 40%, by weight C. 3 – 6% by weight of butyl cyclohexyl phthalate.

The acrylic oxazoline polymers mentioned above can be prepared according to Donatello, et al., U.S. Pat. No. 3,553,124 issued Jan. 5, 1971.

The above blends can be applied according to the aforementioned conventional techniques to the aforementioned flexible substrates in particular primed flexible bumpers of high density polyurethane foam reinforced with steel and hydrocarbon rubber bumpers reinforced with steel and air dried to form high quality finishes.

The following examples illustrate the invention. All quantities are shown on a weight basis unless otherwise specified.

EXAMPLE 1

The coating composition is prepared by blending together the following ingredients:

| | Parts by Weight |
|---|---|
| Ethylene glycol monoethyl ether acetate | 529 |
| V. M and P naphtha | 1646 |
| Butyl acetate | 1800 |
| Methyl ethyl ketone | 1845 |
| Butyl benzyl phthalate | 880 |
| MMA/MESO copolymer solution (40% copolymer solids of a 95/5 copolymer of methyl methacrylate/ 3-(2-methacryloxyethyl) - 2,2- spiro cyclohexyl oxazolidine in a 24/76 acetone/toluene solvent blend) | 660 |
| MMA/BA copolymer solution (40% copolymer solids of a methyl methacrylate/ butyl acrylate, 82/18 copolymer, in a solvent blend of 66.7% toluene/24.4% butyl acetate/ 8.9% methyl ethyl ketone) | 2640 |
| Total | 10,000 |

The above ingredients are thoroughly blended together to form a clear coating composition which has a binder solids of about 22%.

The coating composition is sprayed onto the sanded surface of a primed flexible bumper of a high density polyurethane which is reinforced with a steel bar. The composition is allowed to air dry for 16 hours and results in a finish which is about 1 mil thick and that has excellent adhesion to the polyurethane substrate, excellent flexibility and forms a high gloss finish.

EXAMPLE 2

A white acrylic lacquer is prepared as follows:

| Portion 1 | Parts by Weight |
|---|---|
| Acetone | 10.70 |
| Ethylene glycol monoethyl ether acetate | 24.20 |
| Toluene | 25.00 |
| Alkyd resin plasticizer (35% coconut oil/61% ethylene glycol phthalate/4% ethylene glycol) | 62.00 |
| Portion 2 | |
| Polymethyl methacrylate solution (40% polymer solids in a solvent of 67% toluene/ 33% acetone) | 119.40 |
| MMA/DEAM copolymer solution (40% polymer solids of a copolymer of 99% methyl methacrylate/1% diethyl amino ethyl methacrylate in a solvent of 33/67 acetone/ toluene) | 50.90 |
| MMA/BA copolymer solution (40% polymer solids of a copolymer of methyl methacrylate/butyl methacrylate, 82/18, in a solvent of 17% acetone/83% toluene) | 184.90 |
| Cellulose acetate butyrate solution (25% solids of cellulose acetate butyrate having a butyryl content of 38% and a 2-second viscosity in a 30/70 acetone/toluene solvent) | 196.20 |
| Portion 3 | |
| White mill base (55% solids dispersion of titanium dioxide dispersed with a resin blend of a methacrylate resin and cellulose acetate butyrate in toluene and ethylene glycol monoethyl ether acetate) | 187.60 |
| Total | 568.70 |

The above portions 1 – 3 are blended together in the order indicated to form the lacquer.

A refinish composition is prepared by thoroughly blending together the following ingredients:

| | Parts by Volume |
|---|---|
| Clear coating composition (prepared in Example 1) | 100 |
| White acrylic lacquer (prepared above) | 100 |
| Lacquer thinner (25.50% acetone/ 11.52% isopropanol/31.40% toluene/11.13% xylene/20.48% ethylene glycol monoethylether acetate) | 150 |
| Total | 350 |

A primed flexible bumper of a high density polyurethane foam reinforced with a steel member (replacement part) is sanded to provide a uniformly roughened surface. The clear coating composition of Example 1 is then sprayed onto the bumper and air dried for 1 minute providing a finish of about 0.5 mil thick. The refinish composition prepared above is then sprayed onto the bumper and air dried providing a finish about 2½ mils in thickness. The resulting finish has excellent adhesion to the substrate, good flexibility and a high gloss and is considered an acceptable finish for automotive bumpers.

High density polyurethane foam bumper which has previously been finished by the original equipment manufacturer with an enamel is sanded and the clear coat of Example 1 and the above refinish composition are applied as above and the resulting finish has good adhesion to the substrate, is flexible and glossy and forms an acceptable automotive refinish product.

Similar results are obtained with Nordel rubber coated bumpers and styrene/butadiene rubber coated bumpers and parts molded from polyvinyl chloride.

EXAMPLE 3

A blue acrylic lacquer is prepared as follows:

|  | Parts by Weight |
|---|---|
| Portion 1 | |
| Aluminum flake dispersion (49% solids of aluminum flake dispersed in toluene with an acrylic-oxazoline resin of methyl methacrylate/ ethyl acrylate/acrylonitrile/ vinyl oxazoline ester of a tall oil fatty acid, weight ratio 55/15/5/25 having a pigment to binder ratio of 23/100) | 127.35 |
| Blue acrylic dispersion (20.5% solids of a copper phthalocyanine blue pigment dispersed in toluene with the above described resin and having a pigment to binder ratio of 26/100) | 44.28 |
| Indo blue pigment dispersion (32.5% solids of indanthrone blue pigment dispersed with the above described resin in a solvent blend of toluene/methyl isobutyl ketone/ ethylene glycol monoethyl ether acetate having a pigment to binder ratio of 44/100) | 11.32 |
| Portion 2 | |
| Iminated acrylic resin solution (40% polymer solids in toluene/isopropanol of a copolymer of methyl methacrylate/ethyl acrylate/ methacrylic acid, 80/13/7, iminated with 4.64% by weight of propylene imine) | 305.81 |
| Acrylic/vinyl oxazoline resin solution (48% solids of the above described acrylic/vinyl oxazoline resin in xylene/ methylamyl acetate/ethylene glycol monoethyl ether acetate/ toluene) | 70.51 |
| Acetone | 27.52 |
| Ethylene glycol monoethyl ether acetate | 4.42 |
| Toluene | 72.16 |
| Hexane | 89.31 |
| Total | 772.68 |

A refinish composition is then prepared by blending together the following ingredients:

|  | Parts by Volume |
|---|---|
| Clear coating composition (prepared in Example 1) | 100 |
| Blue acrylic lacquer (prepared above) | 100 |
| Lacquer thinner (described in Example 2) | 150 |
| Total | 350 |

A primed flexible bumper of a high density polyurethane foam reinforced with a steel member (replacement part) is sanded to provide a uniformly roughened surface. The clear coating composition of Example 1 is then sprayed onto the bumper and air dried for 1 minute providing a finish of about 0.5 mil in thickness. The refinish composition prepared above is then sprayed onto the bumper and air dried providing a finish about 2½ mils in thickness. The resulting finish has excellent adhesion to the substrate, good flexibility and a high gloss and is considered an acceptable finish for automotive bumpers.

High density polyurethane foam bumper which has previously been finished by the original equipment manufacturer with an enamel is sanded and the clear coating of Example 1 and a coating of the above refinish composition are applied as above and the resulting finish had good adhesion to the substrate, is flexible and glossy and forms an acceptable automotive bumper finish product.

EXAMPLE 4

A white acrylic tinting lacquer is prepared as follows:

|  | Parts by Weight |
|---|---|
| White mill base (67.6% titanium dioxide pigment solids dispersed with acrylic - oxazoline resin described hereinafter in a solvent mixture of methyl isobutyl ketone and toluene and having a pigment/ binder ratio of 636/100) | 63.77 |
| "Bentone" mill base (25.7% benetone pigment solids dispersed with the above acrylic oxazoline polymer described hereinafter in methyl isobutyl ketone/ ethyl glycol monoethyl ether acetate solvent blend and having a pigment to binder ratio of 45/100) | 9.40 |
| Acrylic-oxazoline polymer solution (48% polymer solids of a polymer of methyl methacrylate/ethylacrylate/ acrylonitrile/vinyl oxazoline tall oil fatty acid ester in a weight ratio 55/15/5/25 in a mixture of esters and aromatic hydrocarbon solvents) | 26.67 |
| Total | 95.84 |

A pigmented polymer blend is then formed by mixing together the following ingredients:

|  | Parts by Weight |
|---|---|
| White acrylic tinting lacquer (prepared above) | 14.80 |
| CAB/plasticizer solution (27% solids of a solution of cellulose acetate butyrate having a 38% butyryl content and a 2 second viscosity n-butyl cyclohexyl phthalate (90/10) in a solvent of 1:1:1 of acetone/ isopropanol/toluene) | 13.86 |
| CAB/plasticizer/acrylic-oxazoline polymer solution (27% solids solution of cellulose acetate butyrate 2-second viscosity, 38% butyryl content/butyl cyclohexyl phthalate/acrylic-oxazoline polymer described above in a weight ratio 49.5/5.5/45; in a solvent of acetone/ isopropanol/toluene in a weight ratio of 3/1/1) | 9.10 |
| Total | 36.95 |

The refinish composition is prepared by blending together the following ingredients:

| | Parts by Volume |
|---|---|
| Pigmented polymer blend (prepared above) | 100 |
| Clear coating composition (prepared in Example 1) | 100 |
| Lacquer thinner (described in Example 2) | 150 |
| Total | 350 |

A primed flexible bumper of a high density polyurethane foam reinforced with a steel member (replacement part) is sanded to provide a uniformly roughened surface. The clear coating composition of Example 1 is then sprayed onto the bumper and air dried for 1 minute providing a finish of about 0.5 mil thick. The refinish composition prepared above is then sprayed onto the bumper and air dried providing a finish about 2½ mils in thickness. The resulting finish has excellent adhesion to the substrate, good flexibility and a high gloss and is considered an acceptable finish for automotive bumpers.

High density polyurethane foam bumper which has previously been finished by the original equipment manufacturer with a white enamal sanded and the clear coat of Example 1 is applied as above and the refinish coat are applied as above and air dried. The resulting finish has good adhesion to the substrate, is flexible and glossy.

The invention claimed is:

1. A coating composition which comprises 40 to 60% by volume, based on the total volume of the coating composition of Composition I and correspondingly, 60 to 40% by volume, based on the total volume of the coating composition of Composition II; wherein Composition I consists essentially of 10-50% by weight of film-forming binder and correspondingly, 90-50% by weight of an organic solvent for the binder wherein the binder consists essentially of
   1. 35-65% by weight, based on the weight of the binder, of a copolymer consisting essentially of the reaction product of 80-90% by weight of methyl methacrylate and correspondingly, 10-20% by weight of an alkyl acrylate or an alkyl methacrylate having 2-12 carbon atoms in the alkyl groups;
   2. 5-20% by weight, based on the weight of the binder, of a copolymer consisting essentially of the reaction product of 85-95% by weight of methyl methacrylate and 5-15% by weight of polymerized adhesion promoting monomer of the formula

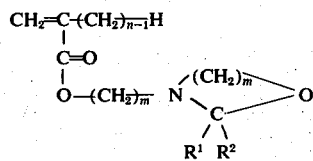

wherein $n$ is 1-2, $m$ is 2-3 and $R^1$ and $R^2$ are selected from the group consisting of hydrogen, phenyl, benzyl, an alkyl group having 1-12 carbon atoms, or in combination are 2,2-spirocyclohexyl; and
   3. 30-50% by weight, based on the weight of the binder, of an organic plasticizer of a phthalate ester or an alkyd resin, and Composition II comprises a pigmented coating composition containing 0.1-20% by weight pigment and 10-50% by weight, based on the weight of the coating composition, of a film-forming binder which consists essentially of 1. 40-90% by weight, based on the weight of the binder, of a polymer consisting essentially of
      a. 75-90% by weight, based on the weight of the polymer, of methyl methacrylate,
      b. less than about 20% by weight, based on the weight of the polymer, of an alkyl acrylate or an alkyl methacrylate having 2-12 carbon atoms in the alkyl groups;
      c. 3-25% by weight, based on the weight of the polymer, of monovalent aminoester radicals attached to the backbone carbon atoms of the polymer backbone of the formula

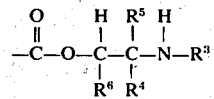

wherein $R^3$, $R^4$, $R^5$ and $R^6$ are hydrogen, benzyl or an alkyl radical having 1-4 atoms; and
   2. 60-10% by weight, based on the weight of the binder, of a polymer which consists essentially of
      a. 30-70% by weight, based on the weight of the polymer, of methyl methacrylate,
      b. less than about 35% by weight of an ester of an alkyl acrylate or an alkyl methacrylate having 2-12 carbon atoms in the alkyl group,
      c. less than about 10% by weight of acrylonitrile,
      d. 15-35% by weight of a compound of the formula

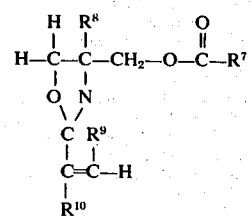

wherein $R^7$ is a saturated hydrocarbon group of 3 - 21 carbon atoms or an unsaturated hydrocarbon group of 3 - 21 carbon atoms; $R^8$ is H, an alkyl group having 1 - 4 carbon atoms or

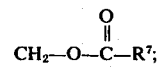

$R^9$ is H, an alkyl group having 1 - 4 carbon atoms; $R^{10}$ is a saturated hydrocarbon group having 2 - 20 carbon atoms or an unsaturated hydrocarbon group having 2 - 20 carbon atoms.

2. The coating composition of claim 1 in which the binder of Composition I consists essentially of
   1. 35-65% by weight, based on the weight of the binder, of a copolymer of the reaction product of 80-90% by weight of methyl methacrylate and 20-10% by weight of butyl acrylate;
   2. 5-20% by weight, based on the weight of the binder, of a copolymer of the reaction product of 85-95% by weight of methyl methacrylate and 15-5% by weight of 3-(2-methacryloxyethyl)-2,2-spirocyclohexyl oxazolidine,
   3. 30-50% by weight, based on the weight of the binder, of butyl benzyl phthalate.

3. The coating composition of claim 1 in which the binder of Composition I consists essentially of
1. 46–50% by weight, based on the weight of the binder, of a copolymer of the reaction product of 82% by weight of methyl methacrylate and 18% by weight of butyl acrylate;
2. 10–14% by weight, based on the weight of the binder, of a copolymer of the reaction product of 95% by weight of methyl methacrylate and 5% by weight of 3-(2-methacryloxyethyl)-2,2-spirocyclohexyl oxazolidine; and
3. 38–42% by weight, based on the weight of the binder, of butyl benzyl phthalate.

4. The coating composition of claim 1 in which the binder of Composition II consists essentially of
1. 50–60% by weight, based on the weight of the binder, of a polymer that consists essentially of
   a. 78–82% by weight of methyl methacrylate,
   b. 12–14% by weight of ethyl acrylate,
   c. 5–8% by weight of monovalent aminoester groups attached to the carbon atoms of the backbone of the polymer of the formula

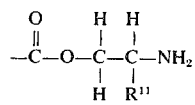

wherein $R^{11}$ is either hydrogen or $CH_3$; and
2. 50–40% by weight, based on the weight of the binder of a polymer which consists essentially of
   a. 53–57% by weight of methyl methacrylate,
   b. 13–17% by weight of ethyl acrylate,
   c. 3–7% by weight of acrylonitrile, and
   d. 23–27% by weight of a compound of the formula

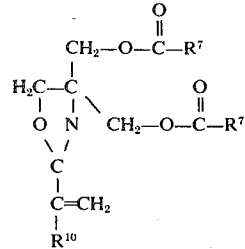

wherein $R^7$ is a hydrocarbon group of tall oil fatty acids and $R^{10}$ is a hydrocarbon group of tall oil fatty acids less a $CH_2$ group.

5. The coating composition of claim 1 in which the binder of Composition I consists essentially of
1. 35–65% by weight, based on the weight of the binder, of a copolymer of the reaction product of 80–90% by weight of methyl methacrylate and 20–10% by weight of butyl acrylate;
2. 5–20% by weight, based on the weight of the binder, of a copolymer of the reaction product of 85–95% by weight of methyl methacrylate and 15–5% by weight of 3-(2-methacryloxyethyl)-2,2-spirocyclohexyl oxazolidine,
3. 30–50% by weight, based on the weight of the binder, of butyl benzyl phthalate; and in which the binder of Composition II consists essentially of
1. 50–60% by weight, based on the weight of the film-forming binder, of a polymer which consists essentially of
   a. 78–82% by weight of methyl methacrylate,
   b. 12–14% by weight of ethyl acrylate,
   c. 5–8% by weight of monovalent aminoester groups attached to the carbon atoms of the backbone of the polymer of the formula

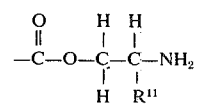

wherein $R^{11}$ is either hydrogen or $CH_3$; and
2. 50–40% by weight, based on the weight of the binder of a polymer which consists essentially of
   a. 53–57% by weight of methyl methacrylate,
   b. 13–17% by weight of ethyl acrylate,
   c. 3–7% by weight of acrylonitrile, and
   d. 23–27% by weight of a compound of the formula

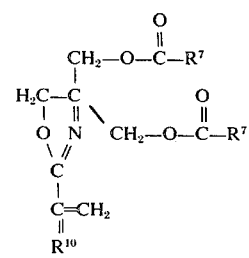

wherein $R^7$ is a hydrocarbon group of tall oil fatty acids and $R^{10}$ is a hydrocarbon group of tall oil fatty acids less a $CH_2$ group.

* * * * *